3,270,459
EQUIPMENT, MORE PARTICULARLY FOR TREATING PLANTLETS BY COLD SHOCKS

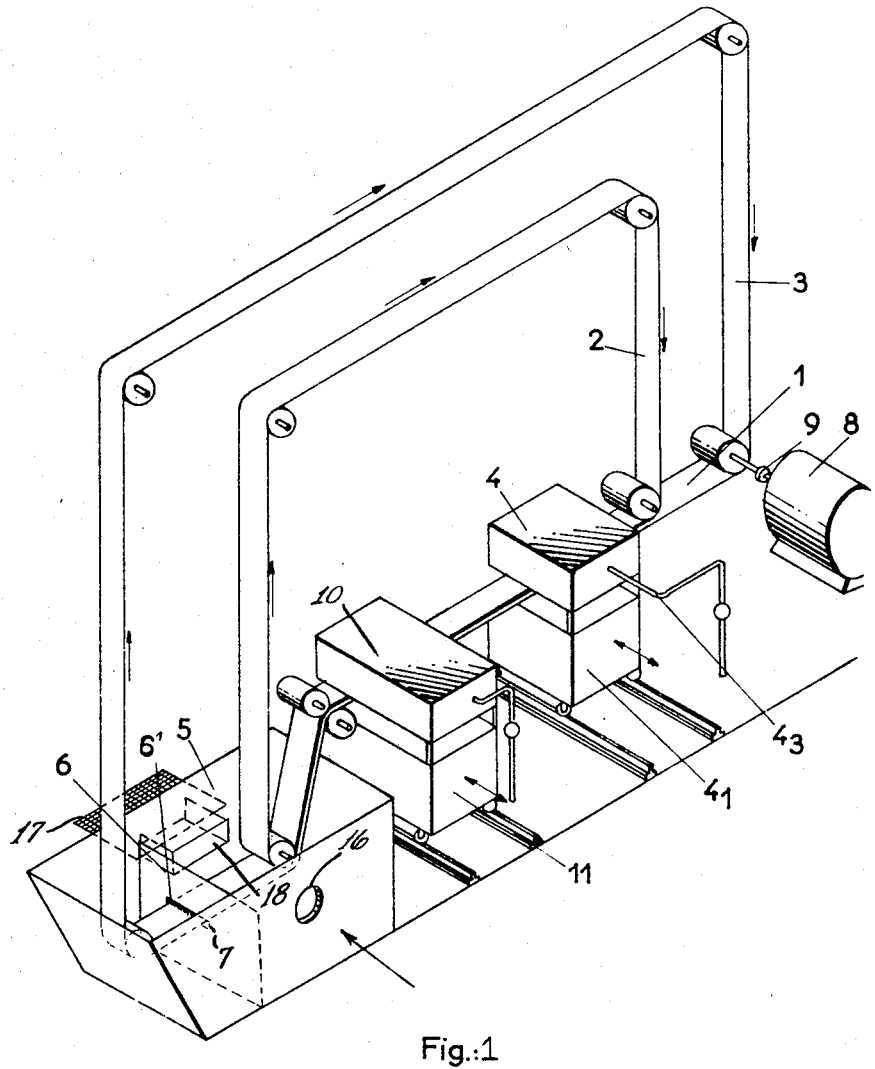
Fig.:1

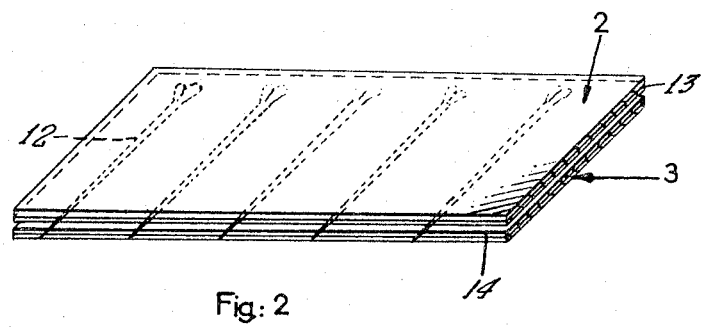
Fig.: 2
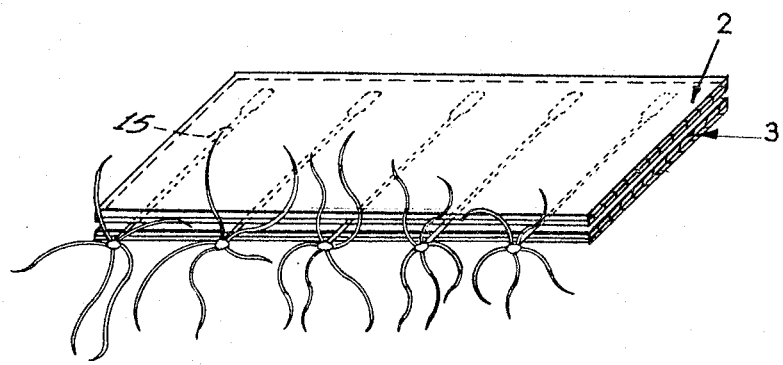
Fig.: 3

Jacques Georges Pottier, 123–125 Rue Notre-Dame-des-Champs, Paris, France
Filed Sept. 5, 1963, Ser. No. 306,742
Claims priority, application France, June 19, 1963, 938,675, Patent 1,361,644
8 Claims. (Cl. 47—1)

The present invention has the object of producing equipment enabling the treatment of plantlets by cold shocks, in large quantities and in a continuous manner.

Most particularly, this invention has the purpose of automatically passing plantlets through refrigerating apparatus and then into reheating apparatus, for modifying the biochemical characteristics of the plants.

Another object of the invention is to provide protection enabling plantlets to be subjected to cold shock while maintaining them impregnated with a maximum of water.

Other objects and advantages of the invention will be revealed by the following description and the attached drawings, in which:

FIG. 1 is a schematic view of my equipment;

FIG. 2 is an enlarged fragmentary perspective view of the conveyor belts carrying one type of plantlet;

FIG. 3 is a similar view but showing the belts carrying another type of plantlet.

Figure 4:
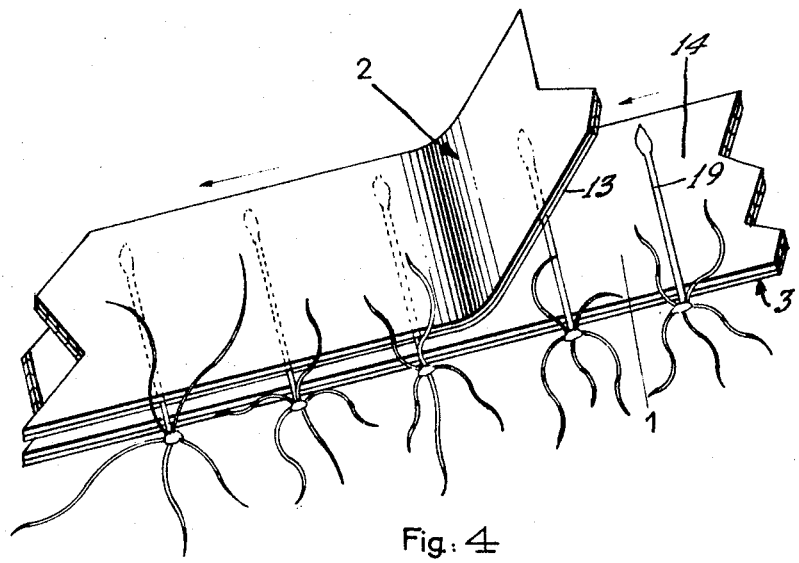
FIG. 4 is a fragmentary perspective view of the belts at the loading station.

The equipment according to the invention comprises:

(a) refrigerating apparatus 4 affording the cold shock;
(b) a reheating apparatus 10 enabling the plantlets, previously subjected to the cold shock, to be warmed up to the ambient temperature,
(c) endless conveyor belts 2 and 3 enabling the transporting of the plantlets through the active zones of the refrigerating apparatus and the reheating apparatus.

In the equipment according to the invention, the plantlets for treatment are introduced into a loading zone 1 before or upstream from the refrigerating apparatus 4. This introduction zone is just before the meeting point of the two conveyor belts, the one being a holding belt 3, the other being a supporting belt 2. The belts form two vertical loops, one inside the other.

The arrangement of plantlets on the lower belt 3 in the loading zone differs according to the kind of plantlets to be treated.

In the example shown in FIG. 2, beet root plantlets 12 are arranged in such a way that the cotyledons (or seed-leaves) as well as the hypocotyl of said plantlets, are situated between the holding belt 3 and supporting belt 2. Protection of the vegetative point of the stems, situated at the base of the catyledons, is obtained by the aid of two layers of calico 13 and 14, which is a hydrophilic material, saturated with water and forming the inner surfaces of the two superimposed lengths of the belts that extend through the refrigerating and reheating apparatus.

On the other hand, for the plantlets 15 of cereals, such as wheat, for instance, the loading of said plantlets on the lower belt will take place in the reverse manner (FIGURE 3); actually, only the leaves will be inserted between the two belts.

As a matter of fact, for wheat and other cereals, which are graminoceae, the vegetative point of the stem is protected by the base of the young leaves, placed at the bottom of a small bag, called "coleoptyl."

Once the plantlets have been inserted between the holding and supporting conveyor belts, the plantlets for treatment are conveyed by means of these belts to the refrigerating apparatus 4, where they are subjected to cold shock, and then on through the reheating apparatus 10 where they are returned to ambient temperature.

The travel of the conveyor belts is ensured by an electric motor 8 or the like, coupled up to a variable speed gear 9 enabling the speed to be regulated in order to vary the time that a plantlet is in the refrigerating apparatus.

By way of example, the refrigerating apparatus 4 is supplied by a liquefied gas, or other refrigerating medium, reaching the top part of the refrigerating apparatus through a conduit $4_3$, this liquefied gas being, more particularly, liquid air.

The liquefied gas, used for the cold shock, is recovered in a lower enclosure $4_1$ of the refrigerating apparatus.

The reheating apparatus 10 is formed by a device spraying water on the belts carrying the plantlets away from the refrigerating zone. The water is recovered in the receptacle 11 of that appparatus.

After reheating, the plantlets are carried by the belts down into a tank 5, which is traversed by a stream of water from an inlet 16 directed across the exposed portion of the lower belt 3 in the tank in order to sweep the plantlets off the belt. They may be recovered in any suitable manner, one way being to provide the side of the tank opposite inlet 16 with an outlet 18, through which the stream of water can carry the plantlets onto a screen or sieve 17 beside the tank. Inside the tank there is means for stopping at a predetermined point the plantlets being carried forward by the lower belt. This means may take the form of a vertical partition 6 provided with a slot 7, through which the belt extends. A brush $6^1$ is mounted in the slot above the belt for holding back the plantlets.

The conveyor belts are formed from pinchbeck in the neighborhood of $\frac{1}{20}$ millimeter in thickness, the pinchbeck assuring by its good thermal conductivity the transmission of the desired positive or negative temperature with a minimum of resistance. Each sheet or band of pinchbeck is lined with a calico band 13 or 14, assuring the protection of the plantlets by the water that was absorbed by the calico during its passage through water tank 5. The saturated calico also maintains the plantlets impregnated with water while passing through the cold shock zone.

The pinchbeck conveyor belts can be replaced by belts made from a plastic such as a polyester resin, with aluminium coating, or the like, this polyester-aluminium sheeting being also lined with calico saturated with water.

The equipment according to the invention has numerous advantages, and more particularly:

(a) the continuous treatment of said plantlets,
(b) treatment in large quantities by the cold shock process.

Obviously, the invention is not restricted to the examples of embodiment described and shown above and from which other methods and forms of embodiment can be provided without going outside of the scope of the invention for that purpose.

What I claim is:

1. Equipment for treating plantlets by cold shock, comprising refrigerating apparatus, reheating apparatus, and a pair of endless conveyor belts for carrying plantlets first through the refrigerating apparatus and then through the reheating apparatus, the lengths of the belts extending through said apparatus being superimposed for holding the plantlets between them, and the belts being separated from each other before the refrigerating apparatus and after the reheating apparatus to form loading and unloading stations for the plantlets.

2. Equipment according to claim 1, in which said reheating apparatus includes means for spraying water on the belts to return the refrigerated plantlets to ambient temperature.

3. Equipment according to claim 2, in which said belts form vertical loops with one of the loops disposed inside the other, said superimposed lengths of the belts being substantially horizontal and located at the bottoms of the loops betwen separated upwardly extending lengths of the belts.

4. Equipment according to claim 1, in which each belt is formed from a material of great thermal conductivity lined with hydrophilic material that engages the hydrophilic material of the other belt while passing through said apparatus, and means is provided for saturating said hydrophilic material with water before it reaches the loading station.

5. Equipment for treating plantlets by cold shock, comprising refrigerating apparatus, reheating apparatus, a water tank, and a pair of endless conveyor belts for carrying plantlets through the refrigerating apparatus and reheating apparatus in succession and then into said tank, the lengths of the belts extending through said apparatus being superimposed for holding the plantlets between them, the belts being separated from each other before the refrigerating apparatus and inside the tank to expose portions of the lower belt for receiving and removing the plantlets, and each belt being formed from a material of great thermal conductivity lined with hydrophilic material that engages the hydrophilic material of the other belt while passing through said refrigerating and reheating apparatus.

6. Equipment according to claim 5, including means for circulating water in said tank across the exposed portion of the lower belt therein to remove plantlets from that belt.

7. Equipment according to claim 5, including means in said tank for stopping at a predetermined point the plantlets being carried forward by the belt supporting them.

8. Equipment for treating plantlets by cold shock, comprising refrigerating apparatus, reheating apparatus, a pair of endless conveyor belts for carrying plantlets first through the refrigerating apparatus and then through the reheating apparatus, the lengths of the belts extending through said apparatus being superimposed for holding the plantlets between them, the belts being separated from each other before the refrigerating apparatus and after the reheating apparatus to form loading and unloading stations for the plantlets, each belt being formed from pinchbeck covered on one side with calico that engages the calico of the other belt while passing through said apparatus, and means for saturating said calico with water before it reaches the loading station.

References Cited by the Examiner
UNITED STATES PATENTS 1,655,954    1/1928    Herold _____ 62—65 X
2,494,027    1/1950    Anderson _____ 62—102

ABRAHAM G. STONE, *Primary Examiner.*

R. E. BAGWILL, *Assistant Examiner.*